United States Patent
Nagata et al.

(10) Patent No.: US 8,154,690 B2
(45) Date of Patent: *Apr. 10, 2012

(54) POLARIZED-LIGHT SPLITTING DEVICE, DISPLAY INCLUDING THE SAME, METHOD OF MANUFACTURING THE SAME, AND APPARATUS FOR MANUFACTURING THE SAME

(75) Inventors: Yoshihide Nagata, Kanagawa (JP); Atsushi Sato, Kanagawa (JP); Hitomu Watanabe, Kanagawa (JP); Ji Woo Kim, Yongin-si (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 731 days.

This patent is subject to a terminal disclaimer.

(21) Appl. No.: 11/819,415

(22) Filed: Jun. 27, 2007

(65) Prior Publication Data

US 2008/0002554 A1    Jan. 3, 2008

(30) Foreign Application Priority Data

Jun. 28, 2006    (JP) .................................. 2006-178415

(51) Int. Cl.
*G02F 1/1335* (2006.01)
*G02F 1/13* (2006.01)

(52) U.S. Cl. .......................................... 349/96; 349/202

(58) Field of Classification Search .............. 349/96–98, 349/201–202, 194; 359/500, 569, 483, 486

See application file for complete search history.

(56) References Cited

U.S. PATENT DOCUMENTS

| 6,665,119 | B1 * | 12/2003 | Kurtz et al. | 359/486 |
| 7,233,563 | B2 * | 6/2007 | Ueki et al. | 369/112.03 |
| 7,746,425 | B2 * | 6/2010 | Atsushi et al. | 349/96 |
| 7,817,225 | B2 * | 10/2010 | Yoshihide et al. | 349/96 |
| 7,935,262 | B2 * | 5/2011 | Nagata et al. | 216/11 |
| 2003/0063241 | A1 | 4/2003 | Matsumoto et al. | |
| 2004/0264350 | A1 | 12/2004 | Ueki et al. | |
| 2005/0088739 | A1 * | 4/2005 | Chiu et al. | 359/486 |
| 2007/0242187 | A1 * | 10/2007 | Yamaki et al. | 349/96 |

FOREIGN PATENT DOCUMENTS

| CN | 1576907 A | | 2/2005 |
| JP | 11-227314 | * | 8/1999 |
| JP | 2003-172918 A | | 6/2003 |
| JP | 2005-037900 | | 2/2005 |
| JP | 2006-003447 | | 1/2006 |

OTHER PUBLICATIONS

Notification of Third Office Action and Text of Third Office Action in CN 200710127524.7, dated May 6, 2011 (Nagata, et al.) (English Translation Only).

* cited by examiner

*Primary Examiner* — Dung T. Nguyen
(74) *Attorney, Agent, or Firm* — Lee & Morse, P.C.

(57) ABSTRACT

A polarized-light splitting device includes a transmissive base member having a base portion and pattern of ridges on the base portion, and a non-transmissive layer on the ridges, wherein the non-transmissive layer includes a light reflecting portion, and a light absorbing portion.

15 Claims, 7 Drawing Sheets

POLARIZED-LIGHT SPLITTING DEVICE, DISPLAY INCLUDING THE SAME, METHOD OF MANUFACTURING THE SAME, AND APPARATUS FOR MANUFACTURING THE SAME

BACKGROUND OF THE INVENTION

1. Field of the Invention

Example embodiments relate to a polarized-light splitting device, a display including the same, a method of manufacturing the same, and an apparatus for manufacturing the same, and, more particularly, to a wire grid type polarized-light splitting device.

2. Description of the Related Art

Generally, an LCD device used in mobile phones, PDAs, monitors of laptop and desktop computers, LCD TVs, etc., may include a liquid crystal layer disposed between polarized light-splitting devices such as polarizing films, and a backlight unit (BLU) providing illumination therefor.

A dichroic polarizing film is commonly used. However, the dichroic polarizing film is limited in that light use efficiency is theoretically not more than 50%, because the dichroic polarizing film absorbs light polarized perpendicular to a transmission axis.

For this reason, a reflective polarized-light splitting device, which can increase light use efficiency by reflecting a non-transmitted component of the polarized light back to the BLU to reuse the same, has been proposed. In particular, a wire grid type polarized-light splitting device has been proposed, which may include a "wire grid," e.g., a pattern of substantially parallel ridges having a conductive material thereon, having a pitch smaller than a wavelength of incident light so as to transmit light polarized perpendicular to the grid and reflect light polarized parallel to the grid. However, there is a need for a polarized-light splitting device that is simple and economical to manufacture in large sizes, which may be used for a liquid crystal display device in mobile phones, personal digital assistants (PDAs), monitors of laptop and desktop computers, LCD TVs, etc.

SUMMARY OF THE INVENTION

Example embodiments are therefore directed to a polarized-light splitting device, a display including the same, a method of manufacturing the same, and an apparatus for manufacturing the same, which substantially overcome one or more of the problems due to the limitations and disadvantages of the related art.

It is therefore a feature of an embodiment to provide a polarized-light splitting device having a reflective portion and an absorptive portion sequentially stacked.

It is therefore another feature of an embodiment to provide a polarized-light splitting device having a reflective portion and an absorptive portion with an intervening intermediate portion, where the intermediate layer has a reflectance that is less than that of the reflective portion and greater than that of the absorptive portion.

At least one of the above and other features and advantages may be realized by providing a polarized-light splitting device including a transmissive base member having a base portion and pattern of ridges on the base portion, and a non-transmissive layer on the ridges. The non-transmissive layer may include a light reflecting portion and a light absorbing portion.

The light reflecting portion and the light absorbing portion may each have a same material composition. The light reflecting portion may have a first material composition, and the light absorbing portion may have a second material composition different from the first material composition. The first material composition may include a metal, and the second material composition may include a metal oxide and/or carbon.

The non-transmissive layer may further include an intermediate portion between the light reflecting portion and the light absorbing portion, the intermediate portion having a reflectivity that is less than that of the light reflecting portion and greater than that of the light absorbing portion. The light reflecting portion, the intermediate portion and the light absorbing portion may each have a same material composition. The light reflecting portion may have a first material composition, and the light absorbing portion may have a second material composition different from the first material composition. The intermediate portion may have a material composition that is a mixture of the first and second material compositions.

The light reflecting portion may be between the transmissive base member and the light absorbing portion. The light absorbing portion may be between the transmissive base member and the light reflecting portion.

At least one of the above and other features and advantages may be realized by providing a method for manufacturing a polarized-light splitting device including providing a transmissive base member having a pattern of ridges on a base portion, and forming a non-transmissive layer on the ridges. The non-transmissive layer may include a light reflecting portion, and a light absorbing portion.

Forming the non-transmissive layer may include depositing the non-transmissive layer by varying a deposition angle according to a height of the non-transmissive layer. The light reflecting portion and the light absorbing portion may each have a same material composition. Forming the non-transmissive layer may include applying the material composition from at least two different angles relative to the base portion, a first angle of the at least two angles may correspond to the light reflecting portion, and a second angle of the at least two angles may correspond to the light absorbing portion.

Forming the non-transmissive layer may include applying the material composition from at least two different ranges of angles, a first range of the at least two ranges may correspond to the light reflecting portion, and a second range of the at least two ranges may correspond to the light absorbing portion. A deposition angle ($\theta H$) in a deposition subprocess of forming the light reflecting portion may have a range of $\theta 2 \leq |\theta H| \leq \theta 1$ ($\theta 2 < \theta 1$), the deposition angle ($\theta H$) being an angle with respect to a normal to a deposition surface, a deposition angle ($\theta L$) in a deposition subprocess of forming the light absorbing portion may have a range of $\theta 3 \leq |\theta L| \leq \theta 4$ ($\theta 3 < \theta 4$), the deposition angle ($\theta L$) being an angle with respect to a normal to a deposition surface, and $\theta 1, \theta 2, \theta 3$ and $\theta 4$ may satisfy the following conditions: $40° \leq \theta 1 \leq 70°$, $20° \leq \theta 2 \leq 50°$, $60° \leq \theta 3 < 90°$, and $60° \leq \theta 4 < 90°$.

The light reflecting portion may have a first material composition, and the light absorbing portion may have a second material composition different from the first material composition. The non-transmissive layer may further include an intermediate portion between the light reflecting portion and the light absorbing portion, the intermediate portion having a reflectivity that is less than that of the light reflecting portion and greater than that of the light absorbing portion. Forming the light reflecting portion may include depositing a first material, forming the light absorbing portion may include depositing a second material, and forming the intermediate portion may include depositing a mixture of the first and second materials. The method may include depositing the first material and the second material on the transmissive base member concurrently from respective first and second positions relative to the transmissive base member, and depositing the mixture of the first and second materials on the transmissive base member from a third position between the first and second positions. The method may further include providing at least one aperture between the first and second positions, and the at least one aperture may be configured to regulate deposition of at least one of the first and second materials.

The method may include passing the transmissive base member across a first aperture in a first direction approximately perpendicular to an extending direction of the ridges and depositing a material on the ridges through the first aperture to form the light reflecting portion, and passing the transmissive base member across a second aperture in the first direction and depositing a material on the light reflecting portion through the second aperture to form the light absorbing portion.

The method may include passing the transmissive base member across a first aperture in a first direction approximately perpendicular to an extending direction of the ridges and depositing a material on the ridges through the first aperture to form the light absorbing portion, and passing the transmissive base member across a second aperture in the first direction and depositing a material on the light absorbing portion through the second aperture to form the light reflecting portion.

At least one of the above and other features and advantages may be realized by providing a display device including a liquid crystal panel, a backlight unit, and a polarized-light splitting device. The polarized-light splitting device may include a transmissive base member having a base portion and pattern of ridges on the base portion, and a non-transmissive layer on the ridges. The non-transmissive layer may include a light reflecting portion, and a light absorbing portion.

The backlight unit may be disposed opposite the ridges, such that the base portion is between the backlight unit and the ridges, and the light reflecting portion may be between the ridges and the light absorbing portion. The backlight unit may be disposed opposite the base portion, such that the ridges are between the backlight unit and the base portion, and the light absorbing portion may be between the ridges and the light reflecting portion.

At least one of the above and other features and advantages may be realized by providing an apparatus for manufacturing a polarized-light splitting device, the polarized-light splitting device including a transmissive base member, the apparatus including a deposition source, a transfer assembly configured to transfer the transmissive base member past the deposition source, and an aperture interposed between the deposition source and the transmissive base member, the aperture configured to regulate exposure of the transmissive base member to the deposition source. The apparatus may be configured to deposit a deposition material on the transmissive base member from at least two ranges of angles relative to the transmissive base member.

The aperture may be configured to limit exposure of the transmissive base member to the deposition source through a first range of the at least two ranges of angles, and the apparatus may further include a second aperture interposed between the deposition source and the transmissive base member, the second aperture being configured to limit exposure of the transmissive base member to the deposition source through a second range of the at least two ranges of angles.

The deposition source may be configured to deposit a first deposition material on the transmissive base member through a first range of the at least two ranges of angles, and the apparatus may further include a second deposition source configured to deposit a second material on the transmissive base member through a second range of the at least two ranges of angles.

BRIEF DESCRIPTION OF THE DRAWINGS

The above and other objects, features and other advantages will become more apparent to those of ordinary skill in the art by describing in detail example embodiments with reference to the attached drawings, in which.

DETAILED DESCRIPTION OF THE INVENTION

Japanese Patent Application No. 2006-178415, filed on Jun. 28, 2006, in the Japanese Patent Office, and entitled: "Polarized-Light Splitting Device and Manufacturing Method Thereof," is incorporated by reference herein in its entirety.

Example embodiments will now be described more fully hereinafter with reference to the accompanying drawing; however, they may be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
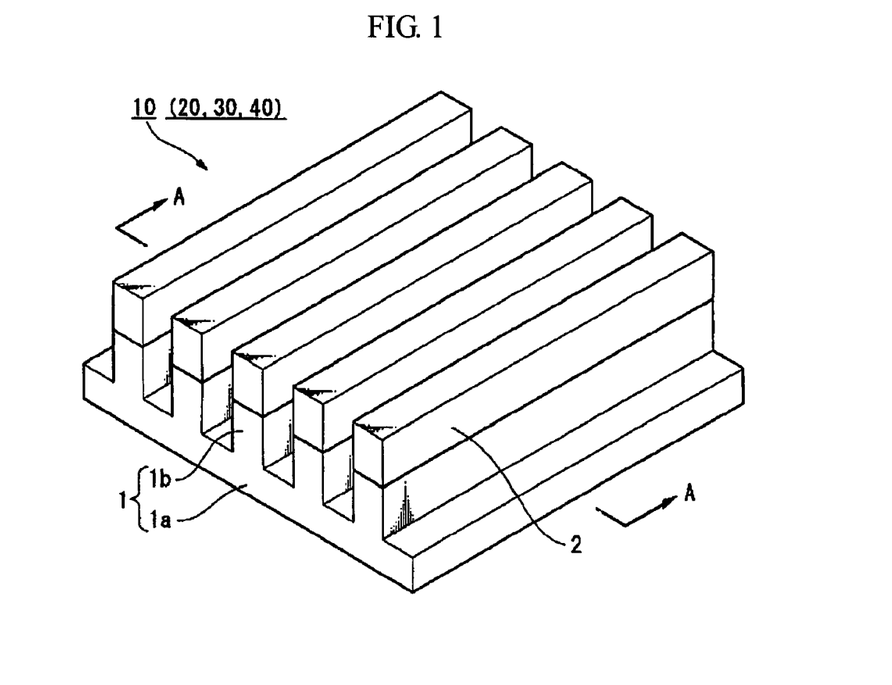
FIG. 1 illustrates a perspective schematic view of an example embodiment of a polarized-light splitting device.

FIG. 1 illustrates a perspective schematic view of a polarized-light splitting device 10 (20, 30, 40) according to first through fourth example embodiments. The polarized-light splitting device 10 (20, 30, 40) may separate polarized light components by transmitting or reflecting incident light according to a polarization direction thereof. The polarized-light splitting device 10 (20, 30, 40) may be a film-type wire grid polarizer (WGP) having a diffraction grid having a pitch smaller than a wavelength of the incident light. The polarized-light splitting device 10 (20, 30, 40) may include a transmissive base member 1, e.g., a transmissive film, which may have a small concave-convex pattern on a surface thereof, e.g., a pattern of substantially parallel ridges with corresponding valleys therebetween. A non-transmissive layer 2 may be disposed thereon at front ends of the convex portions of the transmissive base member 1, i.e., on the ridges.

Figure 2:
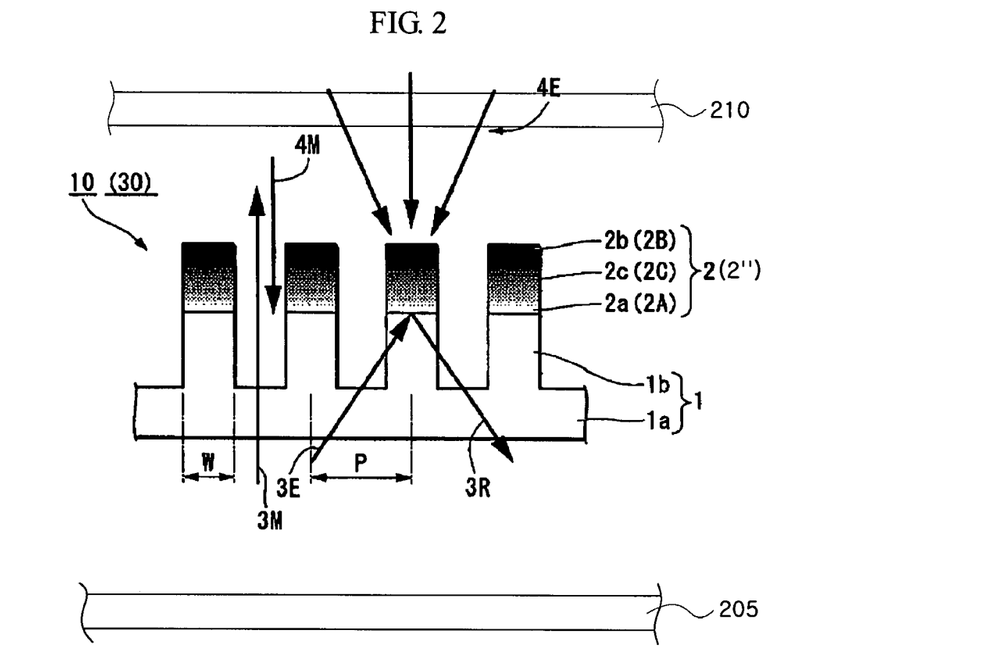
FIG. 2 illustrates a sectional view taken along line A-A in FIG. 1.
Figure 8:
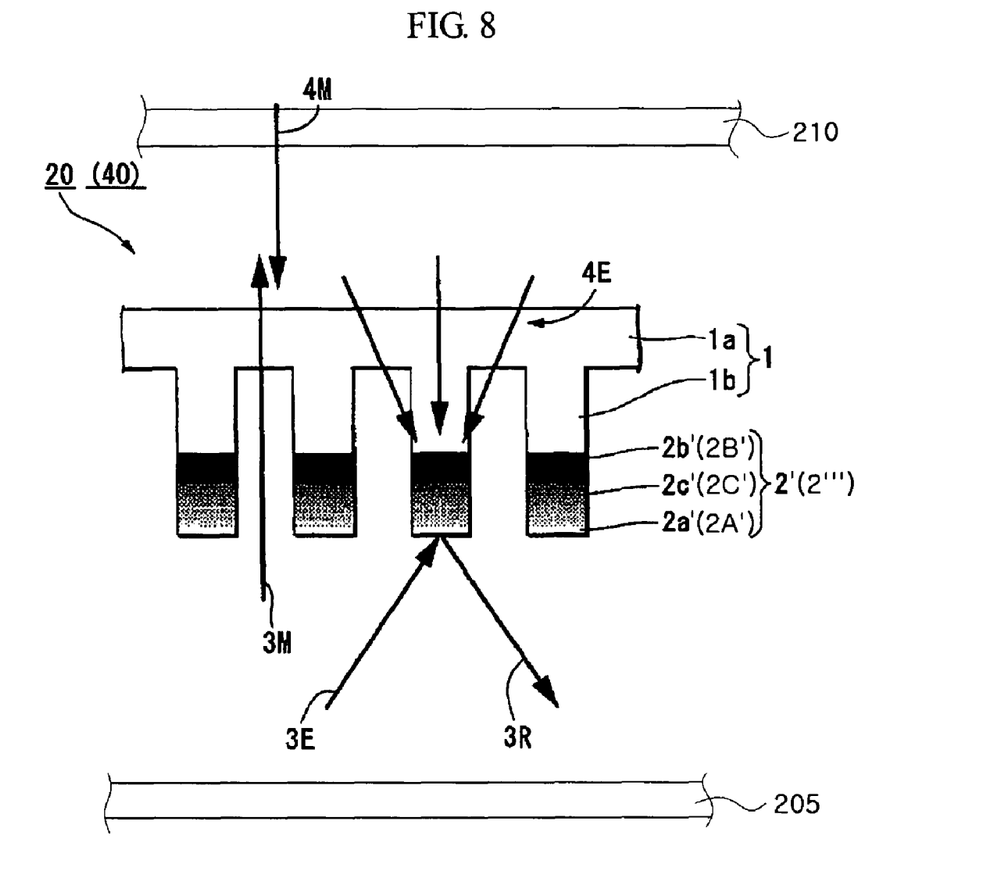
FIG. 8 illustrates a schematic sectional view of another example embodiment of a polarized-light splitting device.

The transmissive base member 1 may include a plurality of grid portions 1b, i.e., convex (ridge) portions, which may have a predetermined width W and may be formed substantially parallel to each other with a grid having pitch P, on a film-shaped base portion 1a (see FIGS. 2 and 8). Here, the grid pitch P may be a very small gap, e.g., narrower than a predetermined wavelength of the incident light.

For example, when used in an LCD device, the polarized-light splitting device 10 may split polarized light in the range of visible light, e.g., light produced by a BLU. In that case, the grid pitch P may be about one-half of the wavelength of visible light or less. In an implementation, the grid pitch P may be less than about 200 nm, e.g., less than about 150 nm. In another implementation, the grid pitch P may be less than about one-fifth of the wavelength of visible light.

A ratio of the grid pitch P to the width W of the grid portion 1b may be about 1 to about 0.5, i.e., the value of W/P may be about 1 to about 0.5. In an implementation, the value of W/P may be adjusted over a range of about ±0.3, e.g., 0.5±0.3 ($0.2 \leq W/P \leq 0.8$), as suits the particular application. In this regard, when adjusting the value of W/P, if value of W/P is less than about 0.5, a degree of polarization may be slightly decreased and an amount of light transmitted may be increased.

The transmissive base member 1 may be made of, e.g., synthetic resins selected to transmit a suitable amount of light over the chosen wavelength range. The synthetic resins may include, e.g., polyethylene terephthalate (PET), polycarbonate (PC), and/or polymethyl methacrylate (PMMA).

The overall surface of the transmissive base member 1 need not be flat. Preferably, the shape of the surface does not excessively block light transmission.

FIG. 2 illustrates a sectional view taken along line A-A in FIG. 1 according to the first and third example embodiments.

The first example embodiment of the polarized light splitting device 10 will now be described with reference to FIGS. 1 and 2.

Referring to FIG. 2, a non-transmissive layer 2 may exhibit a reflectance that decreases from an lower portion to an upper portion thereof. The change in reflectance may be stepwise or gradual, and may be monotonic. More particularly, the non-transmissive layer 2 may be deposited on the transmissive base member 1 and may include a high-reflectivity portion 2a provided on the front, or convex, surface of the grid portion 1b, and a low-reflectivity portion 2b provided at an uppermost portion of the non-transmissive layer 2. The high-reflectivity portion 2a and the low-reflectivity portion 2b may be macroscopically characterized as a reflecting surface and a light-absorbing surface, respectively. However, the high-reflectivity portion 2a and the low-reflectivity portion 2b may be microscopically characterized as portions of the non-transmissive layer 2, which perform light reflection and light absorption, respectively. As used herein, light absorption refers to a level of reflectivity that is less than that of the light-reflecting portion 2a that faces a light source.

The low-reflectivity portion 2b may allow light to be transmitted to a certain extent. However, the low-reflectivity portion 2b may exhibit light absorption, so that light transmitted into the non-transmissive layer 2 is not transmitted through the low-reflectivity portion 2b. For this reason, a light transmission protective coating may be formed, e.g., separately from the low-reflectivity portion 2b.

Reflectance variation in the non-transmissive layer 2 may be achieved by, e.g., varying a quality, composition and/or structure of deposited material in the non-transmissive layer 2. In an implementation, a reflective material, e.g., aluminum, may be used as the deposition material. The non-transmissive layer 2 may be formed by changing a deposition angle of the material during formation of the non-transmissive layer 2, such that the structure of the deposited material varies from a dense state (reflective) to a porous state (absorptive). Aluminum may be particularly suitable, as it may exhibit a significant variation in reflectivity depending on the angle of deposition. However, other materials may also exhibit the desired variation in reflectivity in the wavelength range of visible light, e.g., silver.

In an implementation, the non-transmissive layer 2 may further include an intermediate portion 2c provided between the high-reflectivity portion 2a and the low-reflectivity portion 2b, and having an intermediate reflectivity. Where the non-transmissive layer 2 includes the intermediate portion 2c, the intermediate portion 2c may exhibit a gradation in reflectance. Once the reflectances of the high-reflectivity portion 2a and the low-reflectivity portion 2b have been appropriately determined, the variation in reflectance of the intermediate portion 2c may be suitably determined. For example, the quality, composition and/or structure of the material may be varied. In forming the intermediate portion 2c, it may be desirable to take into consideration the effects of the intermediate portion 2c on the overall strength of the non-transmissive layer 2. In an implementation, the composition of the intermediate portion 2c may be varied, e.g., monotonically. For example, the non-transmissive layer 2 may be formed in a three-layer structure such that the high-reflectivity portion 2a and the low-reflectivity portion 2b have a thickness suitably large to perform the respective reflection and absorption functions, and the composition of the intermediate portion 2c may be smoothly varied between the high-reflectivity portion 2a and the low-reflectivity portion 2b. In another implementation, reflectance in the non-transmissive layer 2 may vary stepwise, e.g., as with a multi-layer structure. In this regard, it may be desirable to avoid sudden large changes in reflectance, e.g., at boundaries between layers.

The reflectance of the high-reflectivity portion 2a may be high, in order to increase the light use efficiency of the polarized-light splitting device 10. Further, the reflectance of the low-reflectivity portion 2b may be low, in order to increase the contrast of the polarized-light splitting device 10. In an implementation, the reflectance of the low-reflectivity portion 2b may be less than about 40%, e.g., about 30% or less.

In operation, with respect to incident light progressing from a light source, e.g., a BLU 205, toward a rear surface of the grid portion 1b of the transmissive base member 1, the polarized-light splitting device 10 may transmit light having a polarization component in one direction, but may reflect light having a polarization component in other directions. The reflected light may be reflected back to a light source.

For example, referring to FIG. 2, when a light source like the BLU 205 is mounted under the polarized-light splitting device 10, e.g., at a side opposite to an LCD panel 210 in a display, and irradiates light toward the polarized-light splitting device 10, a transverse magnetic (TM) wave component 3M, whose vibration direction of an electric field is perpendicular to the grid direction, i.e., left-to-right in FIG. 2, the grid direction being the extending direction of the ridges, perpendicular to the paper surface of FIG. 2, of the polarized-light splitting device 10, may be transmitted upward through the grid portion 1b.

On the other hand, a transverse electric (TE) wave component 3E, whose vibration direction of an electric field is parallel to the grid direction, i.e., in-and-out of the plane of FIG. 2, cannot be transmitted through the grid portion 1b, and may be reflected by the high-reflectivity portion 2a, such that a reflected light component 3R returns to the light source. The reflected light component 3R may then be reflected over and over inside the device, and re-irradiated onto the polarized-light splitting device 10. Thus, because the reflected light component 3R may be reused through reflection, rather than being absorbed, the light use efficiency may be increased.

Also, when the light is irradiated onto the polarized-light splitting device 10 from outside, i.e., from above in FIG. 2, a TM wave component 4M may be transmitted through the transmissive base member 1, while a TE wave component 4E may not be transmitted. The TE wave component 4E may be at least partially absorbed by the low-reflectivity element 2b. Thus, since the low-reflectivity portion 2b may have a relatively low reflectivity, a portion of the light may be absorbed in the low-reflectivity portion 2b, attenuating the amount of light reflected upward and thereby enhancing the contrast of a displayed image. When the polarized-light splitting device 10 is used in the LCD device, the TM wave component 4M and the TE wave component 4E may correspond to external light.

Hereinafter, a method and apparatus for manufacturing the polarized-light splitting device 10 according to the first example embodiment will be described.

Reflectance of the deposition material may be dependent on the deposition angle when metals or metal compounds are used as the deposition material. The method and apparatus that will now be described employ this property to vary the reflectance of the non-transmissive layer 2 by changing the deposition angle.

Figure 3:
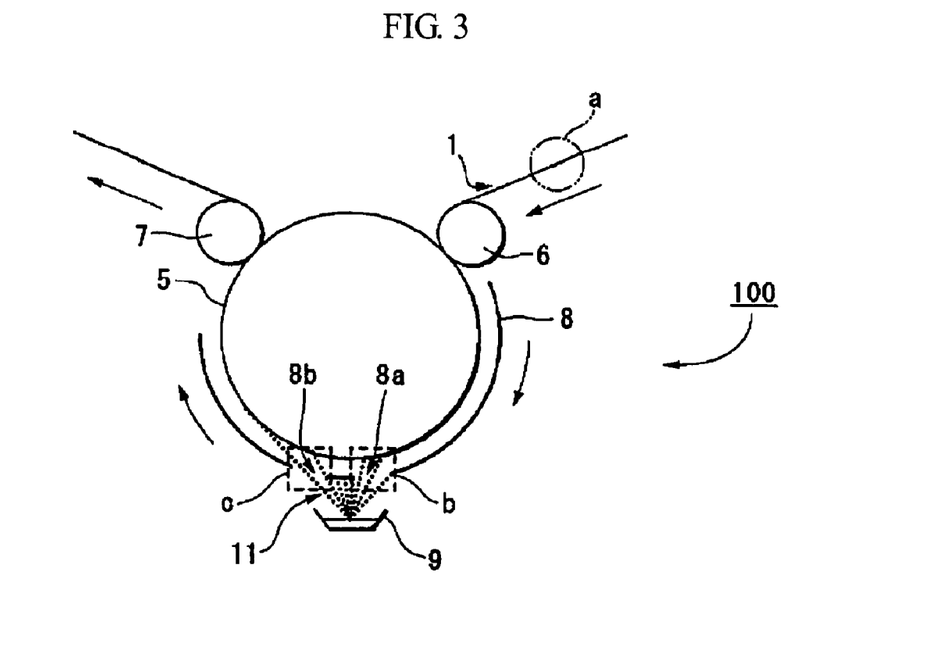
FIG. 3 illustrates a schematic view of an example embodiment of an apparatus for manufacturing a polarized-light splitting device.
Figure 4:
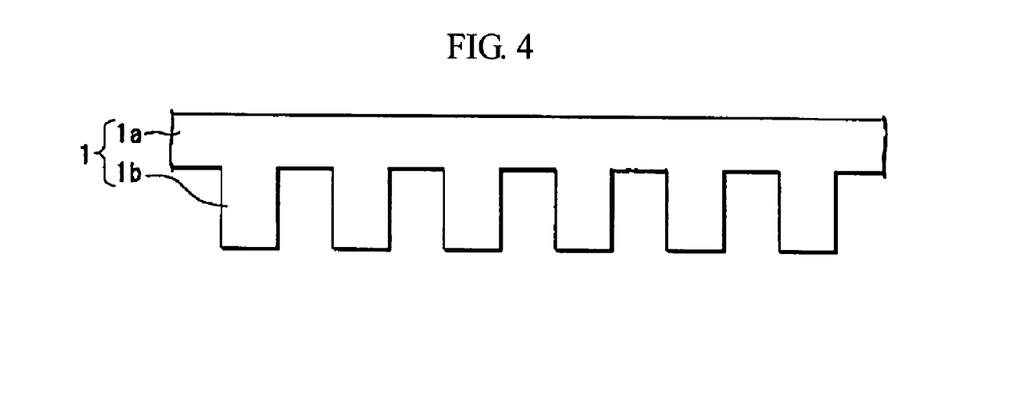
FIG. 4 illustrates an enlarged view of a portion "a" in FIG. 3.
Figure 5:
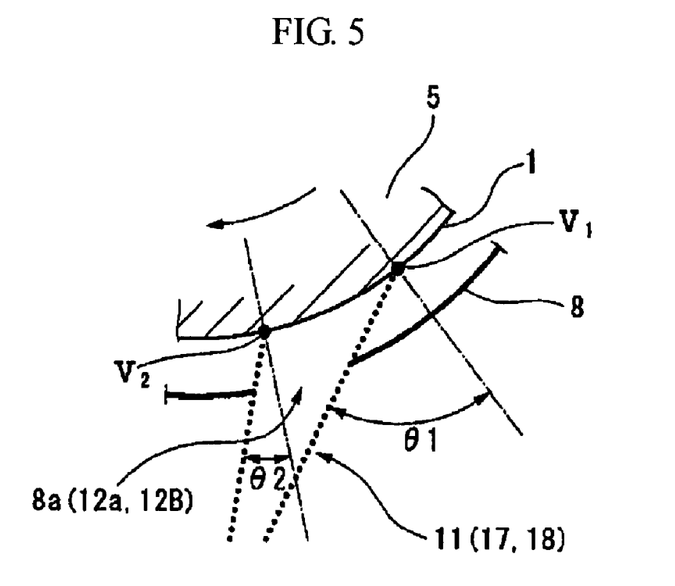
FIG. 5 illustrates an enlarged view of a portion "b" in FIG. 3.
Figure 6:
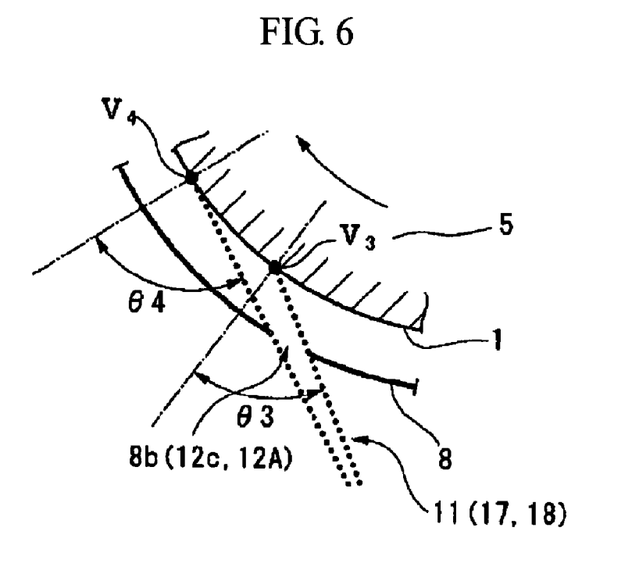
FIG. 6 illustrates an enlarged view of a portion "c" in FIG. 3.
Figure 7:
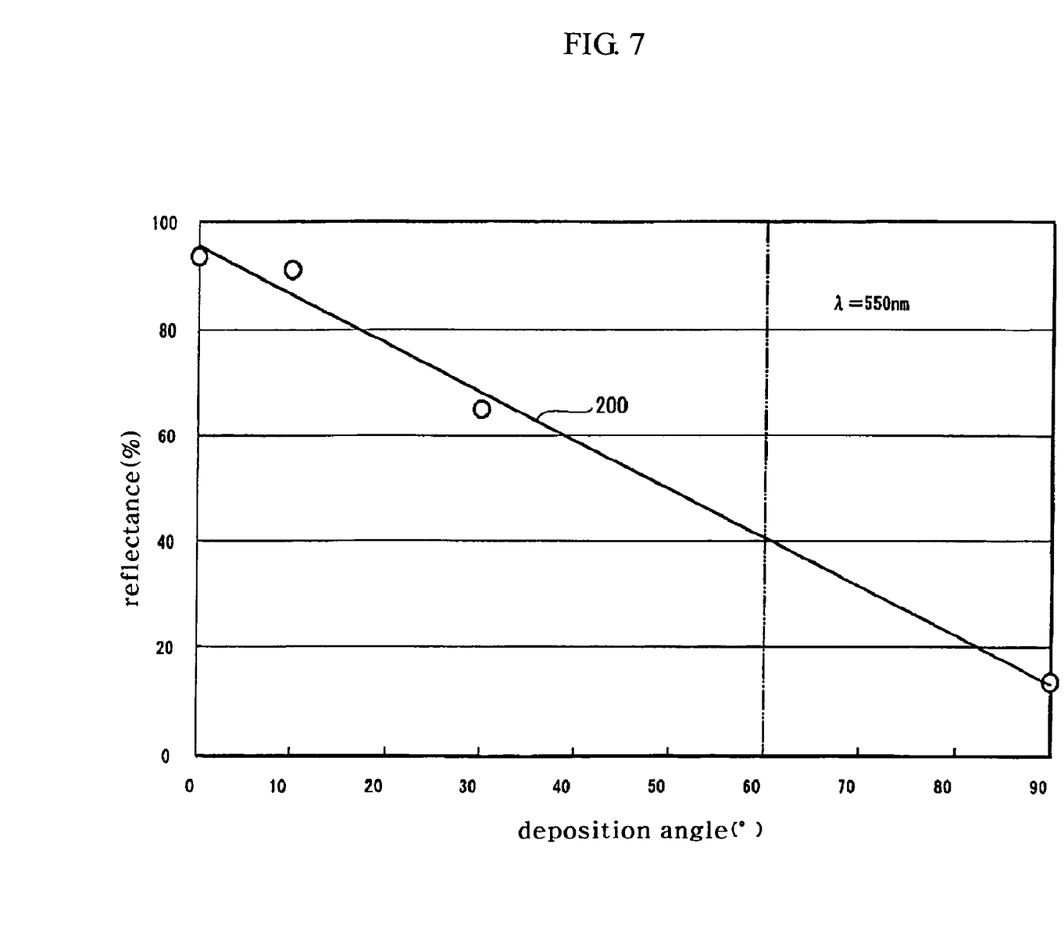
FIG. 7 illustrates a graph showing a relationship between reflectivity of a deposited material and deposition angle.

FIG. 3 illustrates a schematic view of an example embodiment of an apparatus for manufacturing the polarized-light splitting device 10, and FIGS. 4 to 6 illustrate enlarged views of portions "a," "b," and "c" in FIG. 3, respectively. Further, FIG. 7 illustrates a graph showing a relationship between reflectance of a deposited material and deposition angle. In FIG. 7, a horizontal axis refers to the deposition angle (°), and a vertical axis refers to the reflectivity (%) at a wavelength of 550 nm.

A polarized-light splitting device manufacturing apparatus 100 shown in FIG. 3 may be used for manufacturing the polarized-light splitting device 10 described above, and may include a cooling drum 5, guide rollers 6 and 7, a deposition source 9 and an aperture to regulate deposition, e.g., a deposition mask 8. The deposition mask 8 may be fixed to or part of a deposition angle determining member. These components may be contained in a vacuum chamber (not shown).

The cooling drum 5 may cool down the transmissive base member 1 to stabilize a temperature thereof, and may transfer the transmissive base member 1 in a circumferential direction of the cooling drum 5. Referring to FIG. 3, when forming the polarized-light splitting device 10, the cooling drum 5 may be rotated clockwise at a constant speed by a motor (not shown). A rotating shaft of the cooling drum 5 may be mounted in a direction perpendicular to a paper surface of FIG. 3, such that the axis of rotation of the cooling drum 5 extends perpendicular to the paper surface of FIG. 3.

The guide roller 6 may rotate together with the cooling drum 5 and may guide the conveyance of the transmissive base member 1 toward the cooling drum 5.

The concave-convex pattern (see FIG. 4), i.e., the grid portion 1b, of the transmissive base member 1 may extend in the same direction as the rotating shaft of the cooling drum 5, i.e., the extending direction may be perpendicular to the paper surface of FIG. 3. The base portion 1a may be wound around the cooling drum 5 and transferred by the rotation of the cooling drum 5.

The guide roller 7 may be rotated together with the cooling drum 5, and may guide the conveyance of the transmissive base member 1, with the non-transmissive layer 2 formed thereon, as it is released from the cooling drum 5.

The deposition source 9 may be configured to deposit a deposition material 11 on the transmissive base member 1, and may heat and spray the deposition material 11. In this example embodiment, the deposition source 9 may be positioned approximately at a middle of the transferring path of the transmissive base member 1 below the cooling drum 5. Accordingly, the deposition material 11 may be diffused upward and may spread radially. In this example embodiment, a central axis of the spray of the deposition material 11 may lie substantially in a vertical direction in FIG. 3.

The deposition mask 8 may be positioned between the deposition source 9 and the cooling drum 5, and may partially cover the cooling drum 5. The deposition mask 8 may include one or more apertures. In an implementation, the deposition mask 8 may include two apertures 8a and 8b each having predetermined widths. The apertures 8a and 8b may determine the positions at which the deposition material 11 is sprayed through the deposition mask 8 onto the transmissive base member 1 as the transmissive base member 1 is transferred by the cooling drum 5.

The aperture 8a may be positioned at an upstream side of the transferring direction of the transmissive base member 1 with respect to the central axis of the spray of the deposition material 11. As shown in the enlarged view of portion "b" in FIG. 5, the deposition angle (with respect to a normal to the transmissive base member 1 as it is transferred along the circumference of the cooling drum 5) may be offset from the normal toward a downstream side of the transferring direction, with the offset varying through a range of angles as the transmissive base member 1 is carried along the cooling drum 5 past the aperture 8a. The deposition angle may vary through a range of angles that begins with an angle $\theta 1$ at the upstream side of the transferring direction and ends at an angle $\theta 2$ at the downstream side of the transferring direction. In an implementation, for aperture 8a, $\theta 1$ may be greater than $\theta 2$, $40° \leq \theta 1 \leq 70°$, and $20° \leq \theta 2 \leq 50°$.

The aperture 8b may be positioned at the downstream side of the transferring direction of the transmissive base member 1 with respect to the central axis of the spray of the deposition material 11. As shown in the enlarged portion of "c" in FIG. 6, the deposition angle with respect to the normal to the transmissive base member 1 transferred along the circumference of the cooling drum 5 may be offset from the normal toward the upstream side of the transferring direction, with the offset varying through a range of angles as the transmissive base member 1 is carried along the cooling drum 5 past the aperture 8b. The deposition angle may vary through a range that begins with an angle $\theta 3$ at the upstream side of the transferring direction and ends at an angle $\theta 4$ at the downstream side of the transferring direction. In an implementation, for aperture 8b, θ3 may be less than θ4, 60°≦θ3<90°, and 60°≦θ4<90°.

Next, a method for manufacturing the polarized-light splitting device 10 by using the manufacturing apparatus 100 will be described.

The transmissive base member 1 may be manufactured by a suitable process, e.g., an imprint process, in order to form the grid portion 1b, e.g., the concave-convex pattern of ridges, thereon. The imprint process may include, e.g., forming a master mold having a fine structure using operations such as electron beam lithography and/or etching, and transcribing the shape of the mold to a plastic film. The imprint process may offer the advantages of a large scale and low costs as compared with a method of forming a concave-convex pattern directly by patterning a film using photolithography and etching.

The transmissive base member 1 may be guided by the guide roller 6 and wound around the cooling drum 5, with the grid portion 1b oriented outward, i.e., away from the cooling drum in a radial direction of the cooling drum 5. The transmissive base member 1 may be transferred along the circumference of the cooling drum 5.

When the transferred transmissive base member 1 reaches an area (a point $V_1$ in FIG. 5) where the deposition material 11 is sprayed through the aperture 8a, a first deposition subprocess may begin, in which the deposited deposition material 11 begins to form the high-reflectivity lower portion 2a of the non-transmissive layer 2. In particular, the convex surface of the grid portion 1b may be coated by the deposition material 11 sprayed through the aperture 8a beginning at the deposition angle θ1. As the transmissive base member 1 is transferred across the aperture 8a with the rotation of the cooling drum 5, the deposition process may progress while the deposition angle is continuously varied up to the angle θ2, completing the formation of the lower portion 2a of the non-transmissive layer 2. At that point, when the transmissive base member 1 reaches a position (a point $V_2$ in FIG. 5) where the mask 8 blocks deposition of the deposition material 11, the first deposition subprocess may end.

When the transferred transmissive base member 1 reaches an area (a point $V_3$ in FIG. 6) where the deposition material 11 is sprayed through the aperture 8b, a second deposition subprocess may begin, in which the deposited deposition material 11 begins to form the low-reflectivity upper portion 2b of the non-transmissive layer 2. In particular, the upper portion 2b may be formed over the lower portion 2a, formed in the first deposition subprocess, by the deposition material 11 sprayed through the aperture 8b through the deposition angle range beginning at angle θ3. As the transmissive base member 1 is transferred across the aperture, the deposition process may progress while the deposition angle is continuously varied to the angle of θ4, completing the formation of the upper portion 2b of the non-transmissive layer 2. At that point, when the transmissive base member 1 reaches a position (a point $V_4$ in FIG. 6) where the mask blocks deposition of the deposition material 11, the second deposition subprocess may end.

After the non-transmissive layer 2 is completely formed on the transmissive base member 1, e.g., through the deposition process, the transmissive base member 1 with the non-transmissive layer 2 may be transferred out of the manufacturing apparatus 100 by the guide roller 7.

FIG. 7 illustrates a graph showing a relationship between reflectance of a deposited material and deposition angle. The case illustrated in FIG. 7 is an experimental result of measuring a reflectance of a plastic film (the same material as the transmissive base member 1) on which an aluminum deposited layer is formed by changing the deposition angle. As seen from FIG. 7, variation in reflectance corresponds approximately to a line 200 in the graph. Thus, the reflectance is maximized at a normal direction (the deposition angle of 0°) to the deposition surface, and is decreased in proportion to an inclination with respect to the normal.

Without being bound by any particular theory, the above-described variation in reflectance is believed to be because, when the deposition angle is small, the thin film is formed densely and uniformly, and when the deposition angle is large, the composition of the thin film is in a more porous state. Thus, even though aluminum can be highly reflective, if the deposition angle is large, the corresponding aluminum-deposited sample may be dark-colored and may have a low reflectance and low brilliance.

In an implementation, the first deposition subprocess may form the high-reflectivity portion 2a on the convex surface of the grid portion 1b, and may form part of the intermediate portion 2c, whose reflectivity is gradually decreased, on the high-reflectivity portion 2a. The second deposition subprocess may form a remaining part of the intermediate portion 2c, whose reflectivity is gradually decreased, as well as the low-reflectivity portion 2b.

As described above, according to the positional relationship between the deposition source 9 and the deposition mask 8, the aperture 8a may be used to form the high-reflectivity portion 2a and the aperture 8b may be used to form the low-reflectivity portion 2b.

In an implementation, if the deposition angle θ2 is set to be equal to the deposition angle θ3 (θ2=θ3), the intermediate portion 2c may be formed such that the reflectance thereof is gradually and continuously varied.

In another implementation, if the deposition angle θ2 is set to be less than the deposition angle θ3 (θ2<θ3), the intermediate portion 2c may be formed such that the reflectance is varied with a discontinuity, formed by an interface of surfaces having a difference in reflectance. It will be appreciated that this discontinuity in reflectance may be significantly smaller than a difference between the reflectance of the high-reflectivity portion 2a and the reflectance of the low-reflectivity portion 2b.

In this case, because the discontinuous surfaces may be made of the same material and the structural discordance may be relatively small as compared to directly combining a structure for the high-reflectivity portion 2a with a separate structure for the low-reflectivity portion 2b, brittleness of the resulting structure may be decreased, an adhering force between the portions 2a and 2b may be increased, and manufacture may be facilitated.

The deposition process may be performed by changing the deposition angle according to the layer height of the deposited layer. The deposited portions 2a and 2b may be formed using a same deposition material 11, and the reflectance thereof may be gradually varied. Also, the deposition process may be divided into the first and second deposition subprocesses, which may have different deposition angle ranges. Thus, a deposited layer where the reflectance is significantly varied may be easily formed, in contrast to, e.g., a single continuous deposition process. In addition, since the non-transmissive layer 2 may be formed from a same deposition material, even where the non-transmissive layer 2 is formed by the separate first and second deposition subprocesses, the structural integrity at boundaries formed thereby can be enhanced. Further, even though the deposition angle may be discontinuously changed, the integrity of the deposited layer may be increased, which may help avoid problems such as collapse of the grid, enabling a reliable wire-grid polarizer (WGP) to be formed.

In the implementation described above, for aperture 8a, $20° \leq \theta 2 \leq 50°$, and for aperture 8b, $60° \leq \theta 3 < 90°$. Also, as described above, in another implementation the deposition angle $\theta 2$ may be set to be equal to the deposition angle $\theta 3$ ($\theta 2 = \theta 3$). It will be further appreciated that, in still another implementation, it may be desirable to set $\theta 2 > \theta 3$, such that the respective deposition subprocesses may include a common angle range, i.e., they may overlap, as needed.

Hereinafter, influence of the deposition angle on the shape of the grid and non-transmissive layer 2 will be described.

When depositing the non-transmissive layer 2 on the convex surface (ridge portion) of the grid portion 1b, which is formed with the concave-convex (ridge-valley) pattern having a smaller pitch than the wavelength of the light, the shape of the deposited layer may change according to the deposition angle. Accordingly, it may be difficult to form the shape of the grid to have a desired profile. In particular, if the deposition angle is too small, the deposited layers on two adjacent grid portions 1b may become connected such that the concave portions, i.e., intervening valley portions, through which the incident light is transmitted, are blocked or partially blocked. On the other hand, if the deposition angle is too large, deflection may be generated at the deposited layer, and a biased grid may be formed. Accordingly, it may be desirable to set the ranges of the deposition angles taking into account their effects on the grid shape.

Reflectances and grid shapes generated after forming deposited layers having a same thickness on a transmissive base member 1 at fixed deposition angles are shown in the following Table 1. The deposition angle is determined as a difference from a normal to the transmissive base member 1. In the column for the "Grid Shape," the most preferable grid shapes are indicated by a "1," other grid shapes that may be desirable are indicated by a "2," and grid shapes that may include undesirable characteristics are indicated by a "3." Particular comments regarding the grid shapes are described in the "Appearance" column.

TABLE 1

| Deposition Angle (°) | Reflectivity | Grid Shape | Appearance |
|---|---|---|---|
| 0 | High | 3 | Upper Portions of Adjacent Grids Connected |
| 10 | High | 3 | Upper Portions of Adjacent Grids Connected |
| 20 | High | 2 | Upper Portions of Adjacent Grids Partially Connected |
| 30 | Middle | 2 | |
| 40 | Middle | 1 | |
| 50 | Middle | 1 | |
| 60 | Middle | 2 | |
| 70 | Low | 2 | Large Grid Inclination |
| 80 | Low | 3 | Large Grid Inclination |
| 90 | Low | 3 | Large Grid Inclination |

As described in Table 1, the deposition angles producing the most preferable and desirable grid shape are in the range of about 30° to about 60°. Referring to FIG. 7, the deposition angle range of about 30° to about 60° corresponds to the reflectivity range of about 67% to about 40%, respectively. The above results are acquired from an experiment made under the condition of depositing at a constant deposition angle.

When depositing by changing the deposition angle, in order that the deposition material covers the overall deposition surface and forms a desirable reflection surface, the time required to form the thin film may depend on the deposition conditions. Accordingly, the deposition angle at the initial or final point of the thin film formation time may not be substantially influential on the features of the thin film. Thus, the above described angle range may be suitably expanded to a range of, e.g., 20° to 70°.

A deposition angle in excess of 70° may result in deflection of the film in some circumstances. However, this may be avoided or may be insignificant when the thickness of the deposited film is thin. In this example embodiment, because the first deposition subprocess is performed in the range that the inclination of the grid is not generated, and then the second deposition subprocess is performed at the condition of the large deposition angle, the height of the layer in the range of the large deposition angle becomes low, and it may be possible to form an excellent grid shape using a wider angle range than that used in the experimental result shown in FIG. 7. In other implementations, it may also be possible to set the deposition angle $\theta 4$ to 90° while forming an excellent grid shape, as described in additional detail below. Thus, it will be appreciated that, with respect to the upper limit and the lower limit of the deposition angle of the respective deposition subprocesses, the ranges of angles used for $\theta 1$, $\theta 2$, $\theta 3$, and $\theta 4$ may be adapted.

FIG. 8 illustrates a sectional view taken along line A-A in FIG. 1 according to the second and fourth example embodiments.

The second embodiment of the polarized light splitting device 20 will be described in connection with FIG. 8.

Referring to FIG. 8, a polarized-light splitting device 20 of this example embodiment may be configured such that a non-transmissive layer 2' of the polarized-light splitting device 10 of the above-described first example embodiment is up/down reversed on the grid portion 1b. The polarized-light splitting device 20 according to the second example embodiment may be configured for use with the 205 BLU disposed on the side of the film having the concave-convex pattern, i.e., on the opposite side to the configuration described above in connection with FIG. 2.

The polarized-light splitting device 20 may be structured such that when light is irradiated toward the non-transmissive layer 2', the TM wave component 3M is transmitted through the polarized-light splitting device 20, the TE wave component 3E is reflected by a high-reflectivity portion 2a', and the reflected light component 3R is directed back to the light source, e.g., the BLU. By disposing the light source, e.g., the BLU 205, to face the non-transmissive layer 2', the polarized-light splitting device 20 can be used in the LCD device, where the polarized-light splitting device 20 of this example embodiment has the same operational effect as the polarized-light splitting device 10 of the first example embodiment. Further, it may be desirable to have the non-transmissive layer 2' disposed at an inner side as shown in FIG. 8.

When the transmissive base member 1 is disposed at the outer side of the polarized-light splitting device 20, the transmissive base member 1 may be made of a material which has low double refractivity and does not scatter the polarized-light even when a transforming process like elongation is applied thereto. Thus, it may be preferable that the transmissive base member 1 does not rescatter the polarized light separated by the function of the polarized-light splitting device 20.

When manufacturing the polarized-light splitting device 20 by using the manufacturing apparatus 100, the polarized-light splitting device 20 may be easily manufactured by merely exchanging the condition of the deposition angle at the first deposition subprocess of the first example embodiment and the condition of the deposition angle at the second deposition subprocess, i.e., reversing the above-described first and second subprocesses. For example, the arrangement of the deposition mask 8 may be configured such that the deposition angles θ1, θ2, θ3 and θ4 of this second example embodiment correspond to the deposition angles θ4, θ3, θ2 and θ1 of the first example embodiment, respectively. Alternatively, the transferring direction of the transmissive base member 1 may be reversed by rotating the cooling drum 5 counterclockwise, the arrangement of the deposition masks 8a and 8b may be left/right reversed (refer to FIG. 3), etc. Because only the positional relationship of the high-reflectivity portion 2a' and the low-reflectivity portion 2b' with respect to the transmissive base member 1 is different from the first example embodiment, the non-transmissive layer 2' of this second example embodiment may have the same operational effect as the non-transmissive layer 2 of the first example embodiment.

The manufacturing method according to this second example embodiment may has a feature where, because the deposition angle when forming the upper portion 2a' of the non-transmissive layer 2 (a lower side in FIG. 8) is smaller than that when forming the polarized-light splitting device 10, the grid-shaped inclination is not generated at the upper portion 2a' of the non-transmissive layer 2.

In first and second example embodiments described in connection with FIGS. 2 and 8, the polarized-light film manufacturing apparatus 100 may successively transfer the light transmission base 1, having a grid portion 1b which is formed with a small concave-convex pattern extending in one direction, in a perpendicular direction to the extending direction of the concave-convex pattern by supporting the rear surface of the base portion 1a, and the non-transmissive layer 2, 2' may be deposited on the transferred light transmission base 1. The manufacturing apparatus may include at least one deposition source 9 disposed opposite to the light transmission base 1, a deposition angle determining member which may be disposed between the deposition source 9 and the base member 1, and two or more apertures 8a, 8b for the deposition source 9 along the transferring direction of the base member 1.

By using the manufacturing apparatus 100, the deposition process may be performed by varying the deposition angle with respect to the normal of the base member 1 from a relatively small value to a relatively large value along the transferring direction of the base member 1, or from a relatively large value to a relatively small value. Using a deposition angle determining member with a single deposition source 9 and two apertures 8a, 8b, corresponding to single deposition source 9, the high-reflectivity deposition portion 2a, 2a' formed with the relatively small deposition angle and the low-reflectivity deposition portion 2b, 2b' formed with the relatively large deposition angle may be produced. By arranging the high-reflectivity deposition portion 2a, 2a' and the low-reflectivity deposition portion 2b, 2b' on the transferring path of the base member 1 in order from high reflectance to low reflectance, or in reverse order, two deposition subprocesses may be performed such that the composition of the non-transmissive layer 2, 2' is varied from high reflectance to low reflectance, or from low reflectance to high reflectance, as the base member 1 is moved in the transferring direction. Thus, the respective reflectivity portions 2a, 2a' and 2b, 2b' of the polarized-light splitting device 10, 20 may be successively formed along the transferring direction of the base member 1.

Hereinafter, a polarized-light splitting device 30 in accordance with the third example embodiment will be described, in which multiple materials are used to manufacture the device.

Referring again to FIG. 2, the polarized-light splitting device 30 according to the third example embodiment may include a high-reflectivity portion 2A, a low-reflectivity portion 2B and an intermediate portion 2C, instead of the high-reflectivity portion 2a, the low-reflectivity portion 2b and the intermediate portion 2c of the polarized-light splitting device 10 according to the first example embodiment. In the following description, only those aspects of the device 30 and its manufacture that differ significantly from those of the first embodiment will be described, in order to avoid repetition.

In the third example embodiment, a gradual variation of the reflectance of the non-transmissive layer 2 may be achieved by changing the quality and/or composition of the deposition materials.

As the deposition material of the high-reflectivity portion 2A, a metal material having a high reflectivity in the wavelength range of visible light, e.g., aluminum or silver, may be used, in similar fashion to the first example embodiment.

As the deposition material of the low-reflectivity portion 2B, a material having a reflectance lower than the high-reflectivity portion 2A, and/or a material having light absorptiveness, may be used. For example, the deposition material of the low-reflectivity portion 2B may include one or more of a metal having a relatively low reflectance, a metal oxide, carbon, etc.

The intermediate portion 2C may be implemented from a mixture of the deposition materials of the high-reflectivity portion 2A and the low-reflectivity portion 2B. Therefore, the reflectance of the intermediate portion 2C may have a value between the reflectance of the high-reflectivity portion 2A and the reflectance of the low-reflectivity portion 2B.

Generally, when depositing different materials, an adhering force between layers may be weak, brittleness may be increased, and manufacturing may become difficult. However, according to the third example embodiment, a composition ratio of the material of the high-reflectivity portion 2A and the material of the low-reflectivity portion 2B may be gradually varied in the intermediate portion 2C between the high-reflectivity portion 2A and the low-reflectivity portion 2B. Thus, a decrease in the adhering force between layers may be reduced or prevented.

The non-transmissive layer 2" according to the third example embodiment may include the upper layer 2B and the lower layer 2A, which may include different deposition materials having different qualities and/or compositions, and the intermediate portion 2C, which may include a the mixture of the different deposition materials having the different qualities and/or compositions, between the upper layer 2B and the lower layer 2A. In such a case, even though the upper layer 2B and the lower layer 2A are made of the different deposition materials having different qualities and/or compositions, since the intermediate portion 2C may be made of the mixture of the different deposition materials and provided between the upper layer 2B and the lower layer 2A, a significant discontinuity between surfaces of different qualities/compositions of the material may be avoided. Accordingly, the integrity of the non-transmissive layer 2" may be strengthened, which may reduce or eliminate defects such as the collapse of the grid, resulting in a highly reliable polarized-light splitting device 30.

Hereinafter, a method and an apparatus 110 for manufacturing the polarized-light splitting device 30 will be described with reference to FIG. 9.

Figure 9:
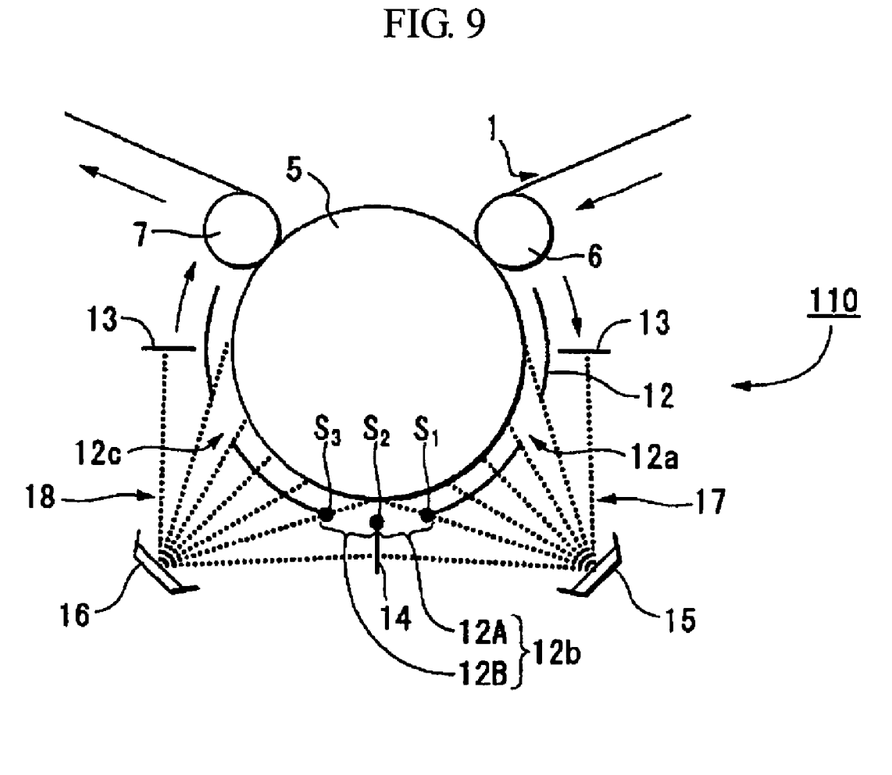
FIG. 9 illustrates a schematic view of another example embodiment of an apparatus for manufacturing a polarized-light splitting device.

FIG. 9 illustrates a schematic view of an example embodiment of an apparatus 110 for manufacturing the polarized-light splitting device 30. Referring to FIG. 9, the manufacturing apparatus 110 may be used to manufacture the polarized-light splitting device 30 and may include a high-reflectivity material deposition source 15 and a low-reflectivity material deposition source 16, instead of the single deposition source 9 of the manufacturing apparatus 100 for the first example embodiment. The apparatus 110 may further include a deposition mask 12 and a mask plate 14, instead of the deposition mask 8 of the manufacturing apparatus 100 for the first example embodiment. In the following description, only those aspects of the method and apparatus 110 that differ significantly from those for the first example embodiment will be described, in order to avoid repetition.

The high-reflectivity material deposition source 15 and the low-reflectivity material deposition source 16 may heat and spray respective deposition materials 17 and 18 for forming the high-reflectivity portion 2A and the low-reflectivity portion 2B, respectively. The high-reflection material deposition source 15 and the low-reflection material deposition source 16 may be respectively positioned at an upstream side and a downstream side of the transferring path of the transmissive base member 1, opposite to each other, below the cooling drum 5. Accordingly, the deposition material 17 may be diffused upward and slantedly to the left and may spread radially toward the upstream side of the transferring direction. The deposition material 18 may be diffused upward and slantedly to the right, and may spread radially toward the downstream side of the transferring direction. In an implementation, the high-reflection material deposition source 15 and the low-reflection material deposition source 16 may be disposed substantially symmetrically to each other.

The deposition mask 12 may be positioned between the deposition sources 15 and 16 and the cooling drum 5, and may partially cover the cooling drum 5. Apertures 12a, 12b and 12c may be formed in the deposition mask 12 with predetermined widths, through which the deposition materials 17 and 18 may be sprayed onto the transmissive base member 1.

The apertures 12a, 12b and 12c may be arranged in order, from the upstream side of the transferring direction to the downstream side of the transferring direction. The aperture 12a may be positioned at the upstream side of the transferring direction with respect to the central axis of the spray of the deposition material 17, and the aperture 12c may be positioned at the downstream side of the transferring direction with respect to the central axis of the spray of the deposition material 18. Also, the aperture 12b may be positioned at the downstream side of the transferring direction with respect to the central axis of the spray of the deposition material 17, and at the upstream side of the transferring direction with respect to the central axis of the spray of the deposition material 18.

A mask plate 14 may be standingly disposed at the middle of the aperture 12b to divide the aperture 12b into right and left portions 12A and 12B, i.e., an upstream aperture 12A at the upstream side of the transferring direction, and a downstream aperture 12B at the downstream side of the transferring direction. If an end of the aperture 12b at the upstream side is defined as an edge S1, the other end of the aperture 12b at the downstream side is defined as an edge S3, and an end of the mask plate 14 at the cooling drum 5 side is defined as an edge S2, then the upstream aperture 12A may be defined by the edges S1 and S2, and the downstream aperture 12B may be defined by the edges S2 and S3.

One or more mask plates 13 may also be provided to prevent the deposition materials 17 and 18 from being diffused outside of the apertures 12a and 12c.

By mounting two deposition sources 15 and 16 along the transferring direction of the transmissive base member 1 and disposing the aperture 12b of the deposition angle determining member between the two adjacent deposition sources 15, 16 so that the different deposition materials 17 and 18 sprayed from the deposition sources 15 and 16 are mixed at the aperture 12b, the manufacturing method according to this example embodiment may provide an intermediate deposition subprocess for depositing the mixture of the deposition materials 17 and 18 through the aperture 12b. Accordingly, it may be easy to form the intermediate portion 2C from the mixture of the deposition materials 17 and 18 sprayed from the two adjacent deposition sources 15 and 16.

The deposition method using the polarized-light film manufacturing apparatus 110 may include the first deposition subprocess, the second deposition subprocess and a third deposition subprocess, which are respectively performed at the positions corresponding to the apertures 12a, 12c and 12b.

In the first deposition subprocess, which corresponds to the first deposition subprocess for the first example embodiment, the deposition material 17 may be diffused through the aperture 12a, and the high-reflectivity portion 2A may be formed by the high-reflectivity material.

In the second deposition subprocess, which corresponds to the second deposition subprocess of the first example embodiment, the deposition material 18 may be diffused through the aperture 12c and may be deposited on the uppermost portion of the deposited layer formed by the third deposition subprocess (described below). As a result, the low-reflectivity portion 2B may be formed from the low-reflectivity deposition material 18.

In the third deposition subprocess, the deposition material 17 may be diffused through the upstream aperture 12A, and the deposition material 18 may be diffused through the downstream aperture 12B at the same time. Therefore, the mixture of the deposition material 17 and the deposition material 18 may be deposited to form the intermediate layer 2C, which may have a graded structure. At this time, according to the respective deposition angles and/or the widths of the apertures 12A and 12B, the deposited location and/or amount of the deposition materials may be changed. Thus, by adjusting the widths and/or positions of the upstream side aperture 12A and the downstream side aperture 12B, a mixture ratio of the deposition materials 17 and 18 may be adjusted along the transferring direction. By such an adjustment, a ratio of the composition of the intermediate portion 2C may be controlled and may be varied in, e.g., a gradual manner.

The component variation may be widely adjusted. However, it may be desirable to avoid discontinuities between material surfaces that affect the intensity of the intermediate portion 2C. For example, the composition ratio of the intermediate portion 2C may be varied such that the component ratio of the deposition material 17 is gradually reduced and the component ratio of the deposition material 18 is gradually increased as the base member 1 progresses toward the downstream side from the upstream side.

In an implementation, the low-reflectivity material 18 may exhibit a reflectivity that changes according to the deposition angle, e.g., aluminum, as described above in connection with the first example embodiment. Thus, the low-reflectivity portion 2B may be formed such that the reflectance becomes gradually lower, in similar manner to the second deposition subprocess of the first example embodiment. In such a case, the materials 17 and 18 may be the same. A gradual variation of the reflectance may be achieved by changing the quality and/or composition of the material. When using a material whose reflectivity varies significantly according the deposition angle, it may be desirable to adjust the deposition angle range, in similar manner to the first example embodiment. The ranges of deposition angles respectively defined by the aperture 12a and the downstream side aperture 12B may each be equal to the range of deposition angles defined by the aperture 8a of the first embodiment. Similarly, the ranges of deposition angles respectively defined by the aperture 12c and the upstream side aperture 12A may each be equal to the range of deposition angles defined by the aperture 8b of the first example embodiment (see the reference numerals indicating the apertures and the deposition angles depicted in FIGS. 5 and 6).

In another implementation, the deposition material 18 may have an intrinsically low reflectivity, largely irrespective of the deposition angle, such that a low-reflectivity portion 2B having a constant reflectivity throughout its thickness is formed. In this case, the deposition angles may be suitably adjusted. Such an intrinsically low-reflectivity material may include, e.g., a metal oxide and/or carbon.

Next, the fourth example embodiment will be described in connection with FIG. 8, in which a the non-transmissive layer 2" is formed by reversing the order of formation of the non-transmissive layer 2.

Referring again to FIG. 8, a polarized-light film 40 may be structured such that the non-transmissive layer 2" of the polarized-light splitting device 30, described above, is up/down reversed. Thus, The polarized-light splitting device 40 may be structured such that a high-reflectivity portion 2A, a low-reflectivity portion 2B and the intermediate portion 2C of the non-transmissive layer 2" of the polarized-light splitting device 30 according to the third example embodiment are replaced by a high-reflectivity portion 2A', a low-reflectivity portion 2B' and the intermediate portion 2C' of the non-transmissive layer 2"' of the fourth example embodiment. That is, the fourth example embodiment may combine the order of the portions of the first example embodiment with the varied material compositions of the third example embodiment.

The polarized-light splitting device 40 of the fourth example embodiment may have the same operational effect as the second embodiment, and may have the base portion 1a provided at the rear surface of the grid portion 1b, with respect to the exterior, such that the grid portion 1b faces the light source, e.g., the BLU.

The polarized-light splitting device 40 may be manufactured by the manufacturing apparatus 110 depicted in FIG. 9, by reversing the transferring direction of the transmissive base member 1 by rotating the cooling drum 5 counterclockwise, or reversing left/right the locations of the high-reflection material deposition source 15, the low-reflection material deposition source 16, the deposition mask 12 and the mask plate 14. Alternatively, the high-reflection material deposition source 15 may be exchanged with the low-reflection material deposition source 16.

Hereinafter, particular Examples 1-4 of wire grid polarizers formed according the above-described example embodiments will be described, together with Comparisons 1 and 2.

EXAMPLE 1

A polyethylene terephthalate (PET) film having a thickness of 100 μm was used as the transmissive base member 1, and the WGP was manufactured as described above in connection with the first example embodiment.

First, the stripe-shaped grid portion 1b was formed on the transmissive base member 1, with a grid pitch P of 150 nm, a width W of 75 nm and a height of 150 nm. This shape of the grid portion 1b is also common to the following Examples 2 to 4.

Aluminum was used as the deposition material 11, which was sprayed from the deposition source 9 for the deposition. Referring to FIGS. 5 and 6, the deposition angles $\theta1$, $\theta2$, $\theta3$ and $\theta4$ were set to be −60°, −30°, 60° and 90°, respectively. In the early stage of the deposition process, the high-reflectivity portion 2a was first formed, and the intermediate portion 2c was formed, the composition of which was gradually varied from the high-reflectivity portion 2a to the low-reflectivity portion 2b according to the change of the deposition angle. In the late stage of the deposition process, the low-reflectivity portion 2b was formed. The height of the non-transmissive layer 2 was 150 nm. As a result, a WGP like the polarized-light splitting device 10 depicted in FIG. 2 was manufactured.

When the WGP was used for a lower polarized-light film of an LCD device of an LCD TV, a bright room (300 Lx) contrast ratio was measured to be 1000:1.

EXAMPLE 2

A polycarbonate (PC) film having a thickness of 100 μm was is used as the transmissive base member 1, and a WGP was manufactured as described above in connection with the second example embodiment. The grid pitch P, width W and height of the grid portion 1b were the same as in Example 1.

Aluminum was used as the deposition material 11, which was sprayed from the deposition source 9. Referring to FIGS. 5 and 6, the deposition angles $\theta1$, $\theta2$, $\theta3$ and $\theta4$ were set to be −90°, −60°, 30° and 60°, respectively. In the early stage of the deposition process, the low-reflectivity portion 2b' was formed first, and the intermediate portion 2c' was subsequently formed, the composition of which was gradually varied from the low-reflectivity portion 2b' to the high-reflectivity portion 2a' according to the change of the deposition angle. In the late stage of the deposition process, the high-reflectivity portion 2a' was formed. The height of the non-transmissive layer 2' was 150 nm. As a result, a WGP like the polarized-light splitting device 20 depicted in FIG. 8 was manufactured.

When this up/down reversed WGP was used for a lower polarized-light film of an LCD device of an LCD TV, a bright room (300 Lx) contrast ratio was measured to be 1000:1.

EXAMPLE 3

A PET film having a thickness of 100 μm was used as the transmissive base member 1, and the WGP was manufactured as described above in connection with the third example embodiment. The grid pitch P, width W and height of the grid portion 1b were the same as in Example 1.

Aluminum was used as the deposition material 17 that was sprayed from the high-reflectivity material deposition source 15, and carbon was used as the deposition material 18 that was sprayed from the low-reflectivity material deposition source 16. The deposition angles $\theta01$, $\theta2$, $\theta3$ and $\theta4$ were set to be −60°, −30°, 60° and 90°, respectively. In the early stage of the deposition process, the high-reflectivity portion 2A made of aluminum was formed first, and the intermediate portion 2C was subsequently formed, in which aluminum and carbon were mixed and the composition ratio of the mixture was gradually varied from the high-reflectivity portion 2A to the low-reflectivity portion 2B. In the late stage of the deposition process, the low-reflectivity portion 2B made of carbon was formed. The height of the non-transmissive layer 2" was 150 nm. As a result, a WGP like the polarized-light splitting device 30 depicted in FIG. 2 was manufactured.

When the WGP was used for a lower polarized-light film of an LCD device of an LCD TV, a bright room (300 Lx) contrast ratio was measured to be 1000:1.

EXAMPLE 4

A PC film having a thickness of 100 μm was used as the transmissive base member 1, and the WGP was manufactured by the polarized-light splitting device manufacturing method according to the exemplary modification of the second embodiment of the present invention. The grid pitch P, width W and height of the grid portion 1b were the same as in Example 1.

In the manufacturing apparatus depicted in FIG. 9, the positions of the high-reflectivity material deposition source 15 and the low-reflectivity material deposition source 16 were switched, such that the high-reflectivity material 17 was deposited from the high-reflectivity deposition source 15 after the deposition of the low-reflectivity material 18 from the low-reflectivity deposition source 16. The deposition angles θ1, θ2, θ3 and θ4 were set to be −60°, −30°, 60° and 90°, respectively. Aluminum was used as the deposition material that was sprayed from the high reflection material deposition source 15, and carbon was used as the deposition material that was sprayed from the low reflection material deposition source 16. In the early stage of the deposition process, the low-reflectivity portion 2B' made of carbon was first formed, and the intermediate portion 2C' was subsequently formed, in which carbon and aluminum were mixed and composition ratio was gradually varied from the low-reflectivity portion 2B' to the high-reflectivity portion 2A'. In the late stage of the deposition process, the high-reflectivity portion 2A' made of aluminum was formed. The height of the non-transmissive layer 2''' was 150 nm. As a result, a WGP like the polarized-light splitting device 40 depicted in FIG. 8 was manufactured.

When the up/down reversed WGP was used for a lower polarized-light film of an LCD device of an LCD TV, a bright room (300 Lx) contrast ratio is measured to be 1000:1.
Comparison 1

Figure 10A:
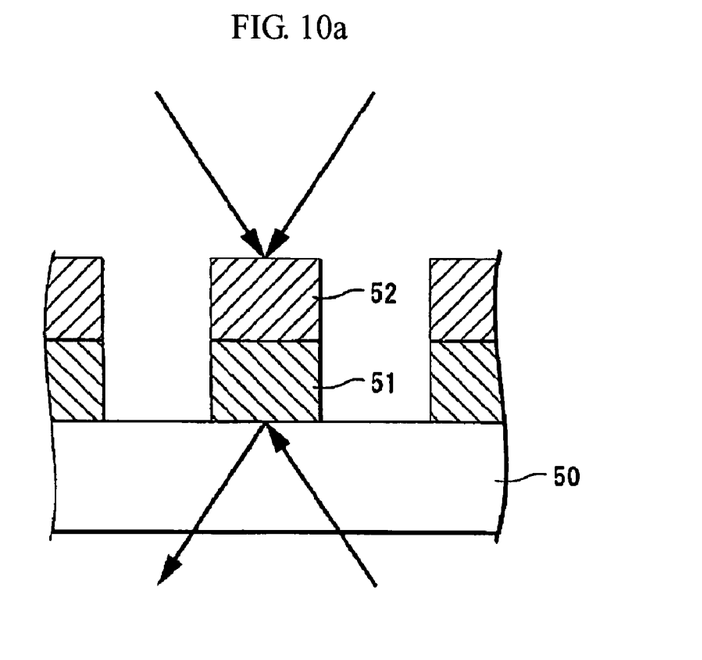
FIGS. 10a and 10b illustrate sectional schematic views of an example embodiment of a polarized-light splitting device and a comparative device, respectively.

Referring to FIG. 10a, a PET film 50 having a thickness of 100 μm was used as the light transmission base, and a WGP depicted in FIG. 10a was manufactured according to the following procedures.

1. Aluminum and carbon were deposited and overlapped on a surface of the PET film 50, having a thickness of 100 nm each.
2. A resist was coated on the deposited layers, and lines and spaces in the resist were formed by lithography and etching.
3. The aluminum layer and the carbon layer were etched using the resist as a mask.
4. The resist remained on the deposited layers was stripped.

The WGP manufactured by the above procedures had a grid pitch P of 150 nm and a grid width W of 75 nm. The total height of the grid was 200 nm, the thickness of the aluminum layer 51 was 100 nm, and the thickness of the carbon layer 52 was 100 nm.

When the WGP was used for a lower polarized-light film of an LCD device of an LCD TV, a bright room (300 Lx) contrast ratio was measured to be 1000:1.
Comparison 2

Figure 10B:
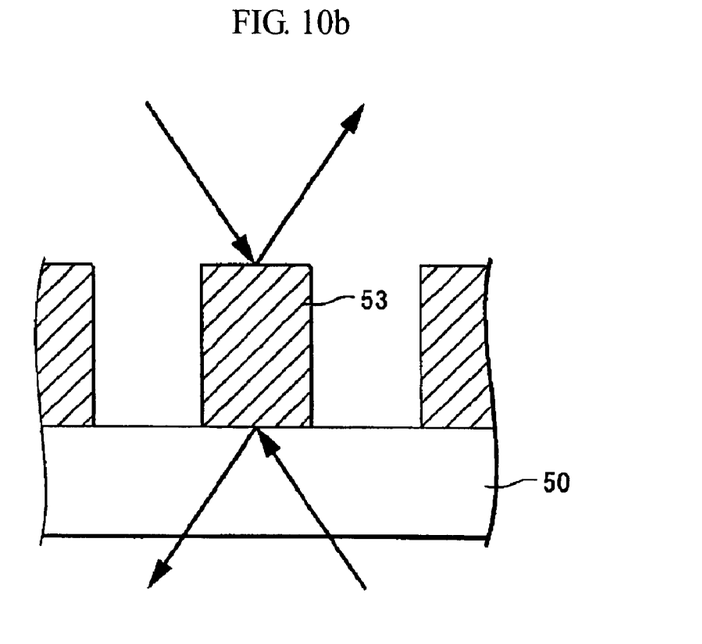

Referring to FIG. 10b, a PET film 50 having a thickness of 100 μm was used as the light transmission base, and a WGP depicted in FIG. 10b was manufactured according to the following procedures:

1. An aluminum layer having a thickness of 150 nm was deposited on a surface of the PET film 50.
2. A resist was coated on the deposited aluminum layer, and lines and spaces in the resist were formed by lithography and etching.
3. The aluminum layer was etched by using the resist as a mask.
4. Resist remaining on the deposited layer was stripped.

The grid from the aluminum layer 53 of the WGP manufactured by the above procedures had a grid pitch P of 150 nm, a grid width W of 75 nm, and a grid height of 150 nm.

When the WGP was used for a lower polarized-light film of an LCD device of an LCD TV, a bright room (300 Lx) contrast ratio was measured to be 500:1.

Evaluation results of the above Examples 1 to 4 and the Comparisons 1 and 2 are summarized in the following Table 2.

TABLE 2

|  | Contrast Ratio | Grid Height | Grid Intensity | Manufacturing Process |
|---|---|---|---|---|
| Example 1 | 1000:1 | 150 nm | Normal | Easy |
| Example 2 | 1000:1 | 150 nm | Normal | Easy |
| Example 3 | 1000:1 | 150 nm | Normal | Easy |
| Example 4 | 1000:1 | 150 nm | Normal | Easy |
| Comparison 1 | 1000:1 | 200 nm | Weak | Difficult |
| Comparison 2 | 500:1 | 150 nm | Normal | Normal |

When compared with Comparison 1, the WGP's of Examples 1 to 4 may be more easily manufactured while exhibiting contrast performance that is the same as Comparison 1. Also, the height of the deposited layer may be kept low, and the intensity of the grid may be maintained normal by forming the intermediate gradation portion between the high-reflectivity portion and the low-reflectivity portion. Also, when compared with Comparison 2, the WGP of Examples 1 to 4 may be more easily manufactured while exhibiting a higher contrast ratio. Thus, the polarized-light splitting devices according to embodiments of the present invention may function as a reflecting type polarized-light splitting element having a high contrast effect and performance.

As described above, a polarized-light splitting device, a display including the same, a method of manufacturing the same, and an apparatus for manufacturing the same may provide a device in which a deposited layer is formed on a grid portion by varying a composition and/or structure of the deposition material, such that the reflectance at the light incidence side is high relative to the incident light and the reflectance becomes relatively low in the direction of the transmission of the incident light. Accordingly, the polarized-light splitting device may exhibit a high contrast effect and intensity of the deposited layer may be enhanced, while increasing manufacturing efficiency and reliability even if a large-scale polarized-light splitting device is manufactured.

Exemplary embodiments of the present invention have been disclosed herein, and although specific terms are employed, they are used and are to be interpreted in a generic and descriptive sense only and not for purpose of limitation. For example, where an embodiment describes a first member as being moved relative to a second member, it will be appreciated that such motion is relative, and the second member could be moved relative to the first member, or both members could be moved.

In an example embodiment described above, it has been explained that two apertures may be formed corresponding to a single deposition source and two stages of the deposition subprocesses may be performed by a single deposition source. The deposition angle may be changed by a deposition angle determining member and the deposited layer may have a reflectivity that is gradually varied. However, it will be appreciated that the number of the apertures corresponding to a single deposition source is not limited to two. For example, according to the required magnitude of the reflectance, one aperture may be paired with one deposition source, a plurality of pairs of apertures and deposition sources may be provided, etc.

A polarized-light film manufacturing apparatus as described above may successively transfer the light transmission base, having a grid portion with a small concave-convex pattern extending in a first direction, in a second, perpendicular direction by supporting a rear surface of the grid portion, and the deposited layer may be deposited on the transferred light transmission base. The manufacturing apparatus may include at least one deposition source, which may be disposed opposite to the light transmission base, and a deposition angle determining member, which may be disposed between the deposition source and the base member and which may have one or more apertures for each deposition source along the transferring direction of the base member. By using the manufacturing apparatus, the deposition process may be performed by varying the deposition angle, with respect to a normal of the base member, from a relatively small value to a relatively large value along the transferring direction of the base member or from the relatively large value to the relatively small value. Accordingly, a deposited layer having a reflectance that is gradually varied according the change of the deposition angle may be formed. The optimal ranges of the deposition angles may be determined from the relationship between the reflectance and the grid shape, as described above.

Also, in the above description, it has been explained that the polarized-light splitting device manufacturing apparatus may include one or two deposition sources. However, it will be appreciated that the manufacturing apparatus may have three or more deposition sources, which may be used to manufacture a polarized-light splitting device whose reflectivity is gradually varied over multiple layers.

Also, in the above description, it has been explained that a central aperture may be divided into an upstream side aperture and a downstream side aperture 12B, e.g., using a mask plate, such that first and second deposition materials can be mixed at a desired rate through the central aperture, However, it will be appreciated that the structure of the manufacturing apparatus may be modified such that the mask plate is omitted and the central aperture is commonly used for both the high-reflection material deposition source and the low-reflection material deposition source.

Also, in the above description, it has been explained that the transmissive base member 1 may be transferred along the outer surface of the cooling drum 5. However, it will be appreciated that the transferring path is not limited to a circumferential shape. The transferring path may be formed in a non-circular curve shape, a straight line shape, a broken line shape, etc., and the deposition mask and the deposition source may be mounted on the transferring path.

Also, in the above description, it has been explained that the deposition angle in the deposition material spraying range may be varied according to the movement of the transmissive base member. However, it will be appreciated that the deposition angle may be varied by moving the deposition mask or the deposition source with respect to the transmissive base member, or by changing the spraying direction of the deposition material, etc.

Accordingly, it will be understood by those of ordinary skill in the art that various changes in form and details, including combining various aspects of the above-described example embodiments, may be made without departing from the spirit and scope of the present invention as set forth in the following claims.

What is claimed is:

1. A polarized-light splitting device, comprising:
    a transmissive base member having a base portion and pattern of ridges on the base portion; and
    a non-transmissive layer on the ridges, wherein the non-transmissive layer includes:
    a light reflecting portion, and
    a light absorbing portion,
    wherein the light reflecting portion is a first material composition in a dense state and the light absorbing portion is the first material composition in a porous state.

2. The device as claimed in claim 1, wherein the non-transmissive layer further includes an intermediate portion between the light reflecting portion and the light absorbing portion, the intermediate portion having a reflectivity that is less than that of the light reflecting portion and greater than that of the light absorbing portion.

3. The device as claimed in claim 2, wherein the light reflecting portion, the intermediate portion and the light absorbing portion each have a same material composition.

4. The device as claimed in claim 1, wherein the light reflecting portion is between the transmissive base member and the light absorbing portion.

5. The device as claimed in claim 1, wherein the light absorbing portion is between the transmissive base member and the light reflecting portion.

6. A method for manufacturing a polarized-light splitting device, comprising:
    providing a transmissive base member having a pattern of ridges on a base portion; and
    forming a non-transmissive layer on the ridges, wherein the non-transmissive layer includes:
    a light reflecting portion, and
    a light absorbing portion,
    wherein the light reflecting portion is a first material composition in a dense state and the light absorbing portion is the first material composition in a porous state.

7. The method as claimed in claim 6, wherein forming the non-transmissive layer includes depositing the non-transmissive layer by varying a deposition angle according to a height of the non-transmissive layer.

8. The method as claimed in claim 6, wherein:
    forming the non-transmissive layer includes applying the material composition from at least two different angles relative to the base portion,
    a first angle of the at least two angles corresponds to the light reflecting portion, and
    a second angle of the at least two angles corresponds to the light absorbing portion.

9. The method as claimed in claim 8, wherein:
    forming the non-transmissive layer includes applying the material composition from at least two different ranges of angles,
    a first range of the at least two ranges corresponds to the light reflecting portion, and
    a second range of the at least two ranges corresponds to the light absorbing portion.

10. The method as claimed in claim 9, wherein:
    a deposition angle ($\theta H$) in a deposition subprocess of forming the light reflecting portion has a range of $\theta2 \leq |\theta H| \leq \theta1$ ($\theta2 < \theta1$), the deposition angle ($\theta H$) being an angle with respect to a normal to a deposition surface, a deposition angle ($\theta L$) in a deposition subprocess of forming the light absorbing portion has a range of $\theta3 \leq |\theta L| \leq \theta4$ ($\theta3 < \theta4$), the deposition angle ($\theta L$) being an angle with respect to a normal to a deposition surface, and $\theta1, \theta2, \theta3$ and $\theta4$ satisfy the following conditions:
$40° \leq \theta1 \leq 70°$,
$20° \leq \theta2 \leq 50°$,
$60° \leq \theta3 < 90°$, and
$60° \leq \theta4 < 90°$.

11. The method as claimed in claim 6, wherein the method includes:
    passing the transmissive base member across a first aperture in a first direction approximately perpendicular to an extending direction of the ridges and depositing a material on the ridges through the first aperture to form the light reflecting portion; and
    passing the transmissive base member across a second aperture in the first direction and depositing a material on the light reflecting portion through the second aperture to form the light absorbing portion.

12. The method as claimed in claim 6, wherein the method includes:
    passing the transmissive base member across a first aperture in a first direction approximately perpendicular to an extending direction of the ridges and depositing a material on the ridges through the first aperture to form the light absorbing portion; and
    passing the transmissive base member across a second aperture in the first direction and depositing a material on the light absorbing portion through the second aperture to form the light reflecting portion.

13. A display device, comprising:
    a liquid crystal panel;
    a backlight unit; and
    a polarized-light splitting device,
    wherein the polarized-light splitting device includes:
        a transmissive base member having a base portion and pattern of ridges on the base portion, and
        a non-transmissive layer on the ridges, wherein the non-transmissive layer includes:
            a light reflecting portion, and
            a light absorbing portion,
            wherein the light reflecting portion is a first material composition in a dense state and the light absorbing portion is the first material composition in a porous state.

14. The display device as claimed in claim 13, wherein:
    the backlight unit is disposed opposite the ridges, such that the base portion is between the backlight unit and the ridges, and
    the light reflecting portion is between the ridges and the light absorbing portion.

15. The display device as claimed in claim 13, wherein:
    the backlight unit is disposed opposite the base portion, such that the ridges are between the backlight unit and the base portion, and
    the light absorbing portion is between the ridges and the light reflecting portion.

\* \* \* \* \*